(12) United States Patent
Nakamichi et al.

(10) Patent No.: US 9,219,891 B2
(45) Date of Patent: Dec. 22, 2015

(54) OBJECT IDENTIFICATION APPARATUS

(71) Applicant: BRAIN CO., LTD., Nishiwaki-shi Hyogo (JP)

(72) Inventors: Morihito Nakamichi, Kobe (JP); Yasushi Shikata, Kato (JP)

(73) Assignee: BRAIN CO., LTD., Nishiwaki-shi, Hyogo (JP)

( * ) Notice: Subject to any disclaimer, the term of this patent is extended or adjusted under 35 U.S.C. 154(b) by 473 days.

(21) Appl. No.: 13/717,717

(22) Filed: Dec. 18, 2012

(65) Prior Publication Data
US 2013/0182106 A1    Jul. 18, 2013

(30) Foreign Application Priority Data

Jan. 13, 2012  (JP) ................................ 2012-005112

(51) Int. Cl.
| H04N 7/18 | (2006.01) |
| H04N 9/04 | (2006.01) |
| G06K 9/20 | (2006.01) |
| G06T 7/00 | (2006.01) |

(52) U.S. Cl.
CPC ................ *H04N 9/04* (2013.01); *G06K 9/2018* (2013.01); *G06T 7/0081* (2013.01); *G06T 7/0083* (2013.01); *G06K 2209/17* (2013.01); *G06T 2207/10024* (2013.01)

(58) Field of Classification Search
None
See application file for complete search history.

(56) References Cited

U.S. PATENT DOCUMENTS

| 2003/0175024 | A1* | 9/2003 | Miyoshi et al. | ............... 396/154 |
| 2007/0279593 | A1* | 12/2007 | Li et al. | ............................ 353/22 |
| 2012/0106837 | A1* | 5/2012 | Partis et al. | .................... 382/165 |

FOREIGN PATENT DOCUMENTS

| JP | 1995-H7-022089 A | 1/1995 |
| JP | 1995-H7-220089 A | 8/1995 |
| JP | 1995-H7-220194 A | 8/1995 |
| JP | H08-335236 A | 12/1996 |
| JP | H10-105694 A | 4/1998 |
| JP | 2000-H12-215315 A | 8/2000 |
| JP | 2000-H12-225049 A | 8/2000 |
| JP | 2002-358520 A | 12/2002 |
| JP | 2004-H16-531822 A | 10/2004 |
| JP | 2005-H17-346391 A | 12/2005 |
| JP | 2011-H23-170745 A | 9/2011 |
| WO | 02-092180 A2 | 11/2002 |

* cited by examiner

*Primary Examiner* — William C Vaughn, Jr.
*Assistant Examiner* — Eileen Adams
(74) *Attorney, Agent, or Firm* — JTT Patent Services, LLC; Gerald T. Peters

(57) ABSTRACT

Identification apparatus is capable of automatically performing processing for separation of objects from background to definitively extract objects to be identified. Backlighting is used to cause illumination from behind a tray on which pastry serving as object has been placed, and while in this state an image of the pastry and the tray are captured. The captured image is converted into an L image representing the L-axis component in Lab color space (S11). The L image is used to create a Canny edge image (S12), and contour extraction is carried out (S13). Pastry region(s) are extracted from background region(s), and a mask image is output (S14, S15). The extracted pastry region(s) are used to carry out identification of pastry type by comparison with registered characteristic quantities. Determination of pastry region(s) is carried out based on magnitude of chromatic dispersion and distance between colors in Lab color space.

10 Claims, 16 Drawing Sheets (a)

(b)

(a)

(b)

őOBJECT IDENTIFICATION APPARATUS

TECHNICAL FIELD

The present invention relates to an object identification apparatus for identifying an imaged object (e.g., bread, pastries, foodstuffs, or the like). In particular, the present invention relates to technology for automatically separating and extracting object(s) from tray(s) or other such background, such processing being a precondition for identification of individual objects based on captured image(s) of one or more objects to be identified.

BACKGROUND ART

Conventionally proposed at Patent Reference No. 1 is technology for obtaining a contour line of an object in order to identify that object when it is contained within image information.

Furthermore, proposed at Patent Reference No. 2 is technology for extracting contours and other such morphological characteristics contained within image information and for comparing these with analogous models to identify an object.

Moreover, proposed at Patent Reference No. 3 is technology for identifying objects containing semitransparent or transparent parts in which photography is carried out against two types of background that are mutually different and that are each of uniform color such as white and black, regions showing little or no change in the two images being identified as objects.

CITATION LIST

Patent Reference Cited

Patent Reference No. 1: JP-A-H7[1995]-220089;
Patent Reference No. 2: JP-A-2000-215315; and
Patent Reference No. 3: JP-A-2004-531822

SUMMARY OF INVENTION

In recent years there has been a trend toward increase in the number of bakeries which sell homemade pastries and there has been a trend toward increase in the number of types of pastries manufactured and/or sold by such bakeries. Note that the term "pastry (pastries)" as used herein includes the concept of bread, sandwich, hot dog, French bread, and so forth. At such a bakery, a customers transfers a pastry which he or she wishes to buy from a shelf on which it is displayed to a tray, and as calculation of price is carried out while the pastry is lying on the tray, such calculation of price has required time and effort. This is so not only because there are many and diverse types of pastries, but also because pastries of the same type do not always appear exactly the same. Accordingly, as sales staff must accurately visually distinguish which type of pastry lies on the tray, and must based thereon accurately enter this at a POS cash register for example, these activities require proficiency in operations. For this reason, the present applicant has made advances in developing technology which makes it possible to use a CCD camera to capture an image of pastry on a tray, use the captured image information to automatically identify the number and type(s) of pastry or pastries on the tray, and automate calculation of price.

With respect to development of such technologies related to identification of pastries, because is it often the case that pastries are typically of brownish color, while it might be expected that separation of pastry from the tray which constitutes background could easily be made possible based on color difference where pastry of brownish color is lying on a white tray, it might be expected that separation of pastry from the tray which constitutes background will be difficult due to difficulties in performing border extraction for a white pastry lying on a white tray.

To address this, it might be thought that instead of using only indoor ambient lighting, active illumination might be directed thereat so as to produce an image having shadows. However, it is thought that because the shadow portions would share characteristics of both the pastry and the tray, it would be difficult to determine whether shadow portions are occupied by pastry or are occupied by the tray which constitutes background, and that extraction of the border between the pastry and the tray would be difficult.

Moreover, there are situations in which there are parts of the pastry within the image that are rendered with the same whitish hue as the tray due to presence of glossy surfaces or due to presence of white powdered sugar that has been sprinkled on the pastry. In such situations, it is necessary that it be determined that such parts rendered with whitish hue are pastry and are not part of the background. Conversely, where the pastry is donut-shaped, for example, and a shadow falls upon the interior of the hole, it is necessary that it be determined that such a location is not pastry but is part of the background. In the latter case, even where the pastry is not donut-shaped, it is thought that a similar situation will occur if, for example, three pastries are placed on a tray in mutually contiguous fashion and the empty region at the center thereof is rendered as a shadow in the image.

It is therefore a technical problem, in developing an object identification apparatus which uses captured image(s) to carry out identification of object(s), to make it possible to automatically perform processing for separation of object(s) from background within image(s) to definitively extract object(s) to be identified.

One embodiment of the present invention, which is directed toward an object identification apparatus comprising image processing means that stores a digital color image of at least one object lying on a tray which has been captured by image capture means, and that performs image recognition on the digital color image to identify at least one type of the at least one object, has the following specific features. That is, provided therein is a backlighting source for producing illumination by backlighting from behind the tray during image capture by the image capture means. The tray is formed so as to be at least semitransparent such that the backlighting is transmitted therethrough to the image capture means side thereof. The image processing means comprises a background separation processing unit that captures an image of an entirety of the at least one object together with at least a portion of the tray as background while illumination by backlighting from the backlighting source is carried out, and that extracts and separates, from a region associated with the background, at least one region associated with the at least one object which is contained in the captured digital color image, and is constituted so as to perform processing for identification with respect to type of the at least one object for each of the at least one region associated with the at least one object obtained by separation by the background separation processing unit. Furthermore, the background separation processing unit is constituted so as to convert the digital color image into an image reflecting a brightness component thereof, use the image obtained by conversion which reflects the brightness component to extract a contour line which is a border line between the object and the background, and use the contour line to extract, from the region associated with the background, the at least one region associated with the at least one object.

As a result of the fact that separation of background is performed at a background separation processing unit based on a digital color image captured while illumination by backlighting from a backlighting source is carried out, this object identification apparatus makes it possible to obtain such remarkable benefits as the following as compared with the situation in which backlighting is not employed. That is, even where an object is of similar color as the tray, and even where there is a part of an object that is of similar color as the tray, causing the background to be illuminated by backlighting makes it possible for region(s) occupied by such object(s) to be extracted from background region(s) dominated by the brightness of the backlighting, and makes it possible for extraction of region(s) occupied by such object(s) to be carried out in definitive fashion. Furthermore, even where height of an object is moderately high, or where affected by shadow due to the fact that there are a plurality of objects lying on the tray, or where there is a through-hole present at the interior of object(s) and a shadow falls upon the interior of such a through-hole, use of background which is illuminated by backlighting will make it possible for region(s) corresponding to object(s) to be accurately distinguished, influence from shadows and the like having been excluded therefrom. Moreover, it will be possible for extraction of region(s) occupied by such object(s) to be carried out in stable fashion without being affected by the surrounding ambient light. This will allow the processing for identification of object(s) which is described below to be carried out in more accurate fashion. Note, moreover, that processing for identification with respect to type of the foregoing object may be such that characteristic quantities pertaining to shapes of color image portion(s) corresponding to image region(s) resulting from division into region(s) may be used as distinctive qualities of various objects to carry out identification with respect to types of the respective objects.

The background separation processing unit in this object identification apparatus may be constituted so as to use a color space having a brightness axis to represent the brightness component, and so that the image obtained by conversion reflects the brightness component along the brightness axis. By so doing, this will make it possible for extraction of contour line(s) constituting border line(s) between object(s) and background to be carried out easily and clearly, and will make it possible for extraction of region(s) occupied by object(s) from background region(s) to be carried out accurately.

Furthermore, the background separation processing unit in this object identification apparatus may be constituted so as to carry out determination as to whether a location is in a background region or is in a region occupied by an object based on magnitude of a distance between color coordinates corresponding thereto in color space. By so doing, even where an object is of similar color as the tray, and even where there is a part of an object that is of similar color as the tray, this will make it possible to accurately determine that such region(s) are occupied by object(s), without misidentifying such region(s) as background region(s).

Moreover, the background separation processing unit in this object identification apparatus may be constituted so as to carry out determination as to whether a location is in a background region or is in a region occupied by an object based on magnitude of chromatic dispersion defined in terms of color coordinates in color space. By so doing, even where there is a through-hole at the interior of an object, because the interior of that through-hole will, like background region(s), have low chromatic dispersion, this will make it possible to definitively determine that the region of such through-hole is a background region, and will make it possible to more accurately carry out determination with respect to region(s) occupied by object(s).

The color space used during processing performed by the background separation processing unit in the foregoing object identification apparatus may be an Lab color space.

BRIEF DESCRIPTION OF DRAWINGS

In the drawings:

FIG. 15 comprises FIG. 15(a) and FIG. 15(b), wherein FIG. 15(a) is a drawing corresponding to FIG. 14 but in which only red LEDs are lit; and FIG. 15(b) is a drawing corresponding to FIG. 14 but in which only blue LEDs are lit.

FIG. 16 comprises FIG. 16(a) and FIG. 16(b), wherein FIG. 16(a) is a drawing showing an example of an image obtained when only red LEDs are lit; FIG. 16(b) is a drawing showing an example of an image obtained when only blue LEDs are lit.

DESCRIPTION OF EMBODIMENTS

Hereinafter, embodiments of the present invention are described with reference to the drawings.

Figure 1:
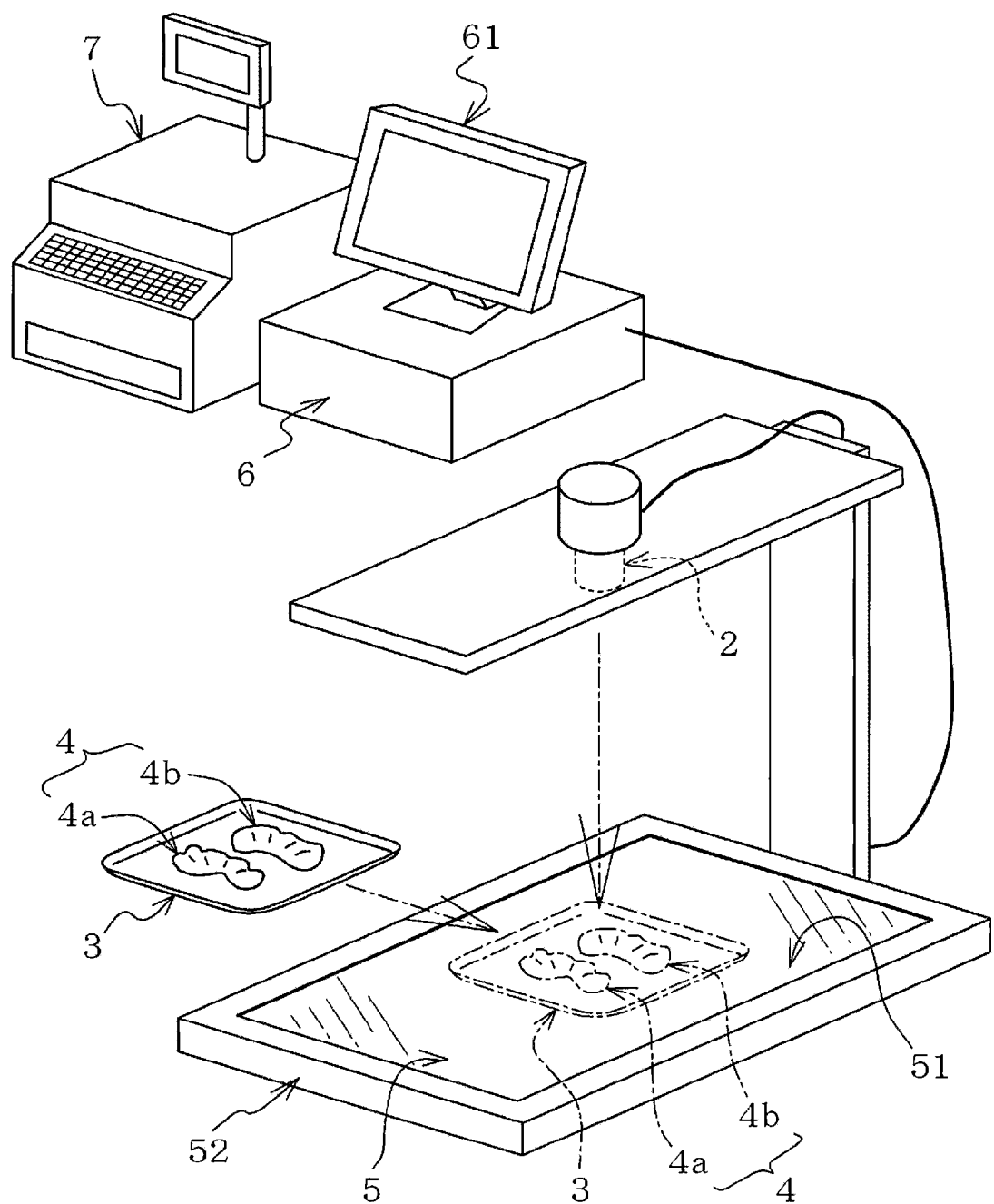
FIG. 1 is a perspective view showing an embodiment of an object identification apparatus in accordance with the present invention.
Figure 2:
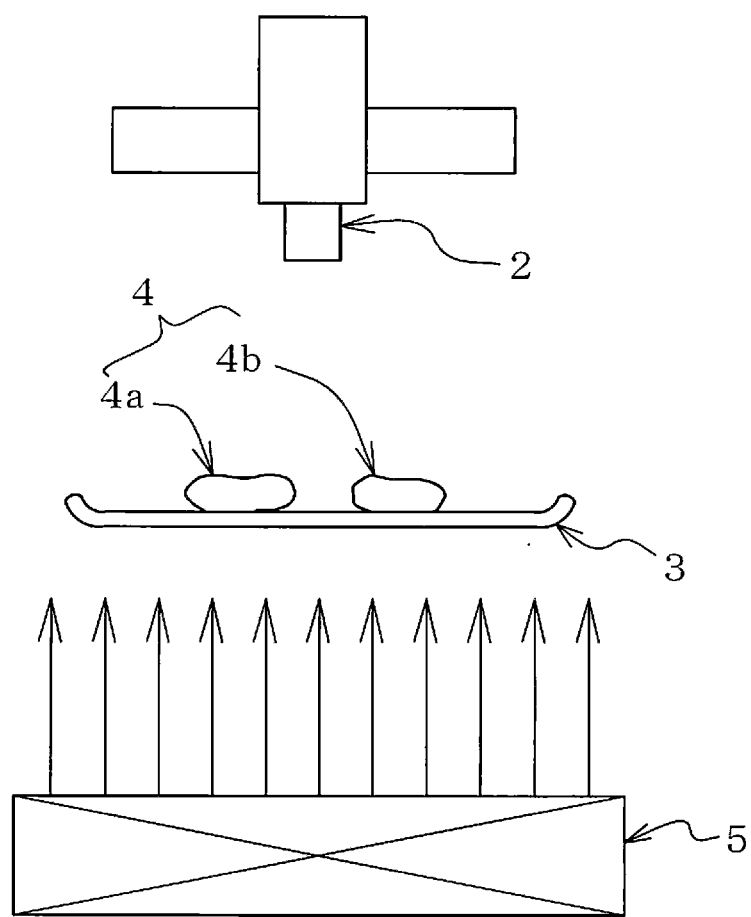
FIG. 2 is a schematic drawing as viewed from the side of the object identification apparatus of FIG. 1.

FIG. 1 shows an object identification apparatus associated with an embodiment of the present invention. Reference numeral 2 is imaging means and may for example comprise a CCD camera. This CCD camera 2 is arranged so as to be capable of capturing, from a location directly thereabove, an image of an object 4 which has been placed on a tray 3 (see also FIG. 2). The object 4 may, for example, be at least one pastry. The term "pastry (pastries)" as used herein may include any or all among the concept(s) of bread, sandwich, hot dog, French bread, and so forth, which shall hereinafter collectively be referred to as "pastry (pastries)". During capture of an image of object 4 by CCD camera 2, whereas ambient light such as is ordinarily present in indoor environments is incident on pastry 4 on tray 3, backlighting from backlighting source 5 provides illumination in upwardly directed fashion from a location below tray 3. Furthermore, reference numeral 6 is an image processing apparatus. This image processing apparatus 6 may, for example, comprise a personal computer provided with CPU, ROM, RAM, hard drive, and communication interface, as well as input unit and/or display unit as appropriate. In addition, operating system(s) and program(s) for performing image processing in accordance with the present embodiment are installed on the aforementioned hard drive(s), as a result of which image processing as described below is capable of being performed. A mouse, keyboard, or the like might for example be used as the aforementioned input unit. A liquid crystal display panel or other such display might for example be used as the aforementioned display unit. A touch panel 61 comprising combination of the aforementioned display together with a touch pad or other such position input device may be employed. Moreover, reference numeral 7 might for example be a POS cash register which is communicatively connected to image processing apparatus 6. POS cash register 7 is capable of receiving identification information regarding number and types of pastries 4a, 4b which is sent thereto from image processing apparatus 6, and is capable of performing display of total price and so forth as well as input/output and/or operations such as sales management, sales performance management, and so forth. POS is an abbreviation which refers to a point-of-sale information management system.

Tray 3 is not transparent, but it is semitransparent such that it allows light to pass therethrough in the vertical direction. Also, tray 3 is formed from material that is of a single color and has no pattern or the like present thereon. In addition, it is desirable, for example, that fine surface irregularities (e.g., matte surface finish) such as will prevent reflection of ambient light and so forth be present at the top face (surface) of tray 3. If coloration is employed at all at tray 3, it is desirable that this be of light shade of color. In a preferred specific embodiment, tray 3 may be formed from material that is white and semitransparent. While object(s) 4 may be an arbitrary number of, for example, pastries, as stated previously, the description which follows is given in terms of an example in which two pastries 4a, 4b have been placed on tray 3, as shown by way of example in the drawings. Note that besides pastry, the present invention may be applied to object(s) 4 in the form of cabbage, carrots, or other such vegetables; apples, pears, or other such fruits; or to any of various other foodstuff(s) or the like. That is, the present invention may be applied to object(s) to be identified which are not identical in form but which are similar, having nearly the same form, but which are products or goods of a sort that are never completely identical in form.

Moreover, in the example shown in the drawings, backlighting source 5 is housed within flat case 52, transparent panel 51 being provided at the top face thereof, and object identification processing, which is described below and which begins with image capture, is made to commence when a customer who wises to purchase pastry puts tray 3, in which the pastry to be purchased has been placed, on top of transparent panel 51. While backlighting source 5 is constituted using LED(s) as light source, the present invention is not limited to thereto, it being possible to employ other light source(s). During capture from thereabove by CCD camera 2 of an image of pastry 4 as pastry 4 lies on the top face of tray 3, the bottom face of tray 3 is illuminated by backlighting from backlighting source 5 which is behind (i.e., to the back surface side of) tray 3. This permits removal, to the maximum extent possible, of shadows that might otherwise form around pastry 4 (4a, 4b). In causing backlit illumination from backlighting source 5 to occur during image capture with CCD camera 2, any of a variety of methods may be employed which include selection from among or switchable combination of the following: synchronization of lighting at backlighting source 5 with image capture occurring at CCD camera 2; asynchronous control of operations at both CCD camera 2 and backlighting source 5 by image processing apparatus 6 as described below; causing backlighting source 5 to stay lit all the time.

Figure 3:
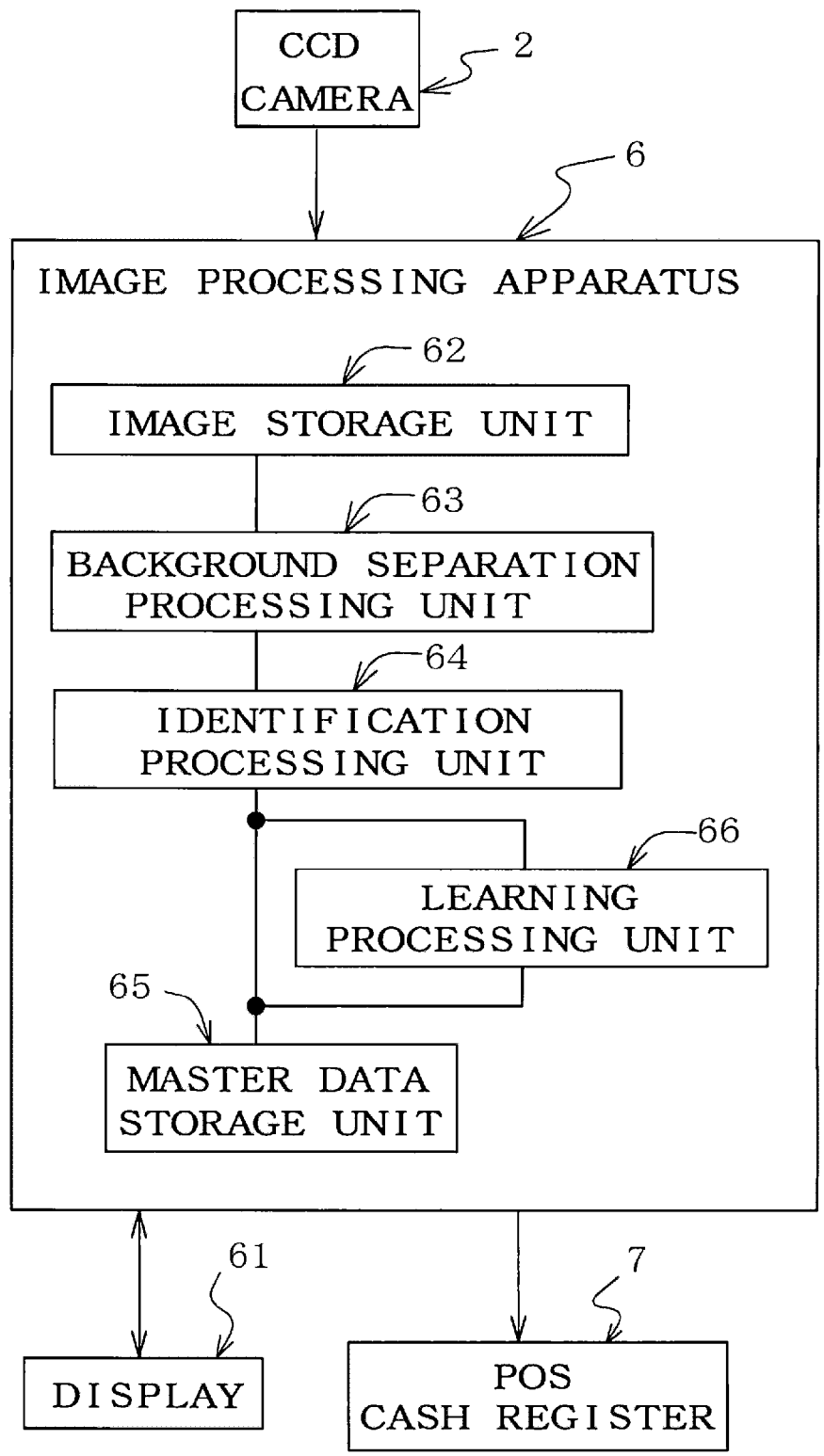
FIG. 3 is a block diagram showing an image processing apparatus constituting a portion of the object identification apparatus of FIG. 1.

As shown in FIG. 3, image processing apparatus 6 comprises image storage unit 62 which stores images (e.g., digital color images) that have been captured by CCD camera 2; background separation processing unit 63 which separates pastry 4 from tray 3 or other such background in the captured images, i.e., extracts and separates out therefrom only the pastry 4 which is to be identified; and identification processing unit 64 which identifies the type of each individual pastry 4 (4a, 4b) based on the extracted images of pastries 4a, 4b. Moreover, to permit identification by identification processing unit 64, image processing apparatus 6 further comprises master data storage unit 65 at which template information and so forth is stored and registered in advance, this template information containing combinations of characteristic quantities based on models constructed for each of the various types of pastries; and learning processing unit 66 which updates the content registered at master data storage unit 65 to reflect learning processing carried out with respect to new characteristic quantities and so forth acquired when identification processing is performed by identification processing unit 64 based on information registered at master data storage unit 65. Results of identification (number and type(s) of pastry) performed by identification processing unit 64 are capable of being output to POS cash register 7. The various types of processing at the foregoing image storage unit 62, background separation processing unit 63, identification processing unit 64, learning processing unit 66, and so forth are respectively performed as a result of execution of prescribed program(s) as described above, image processing apparatus 6 being constituted so as to be provided with functionality for execution of each these various types of processing.

Figure 4:
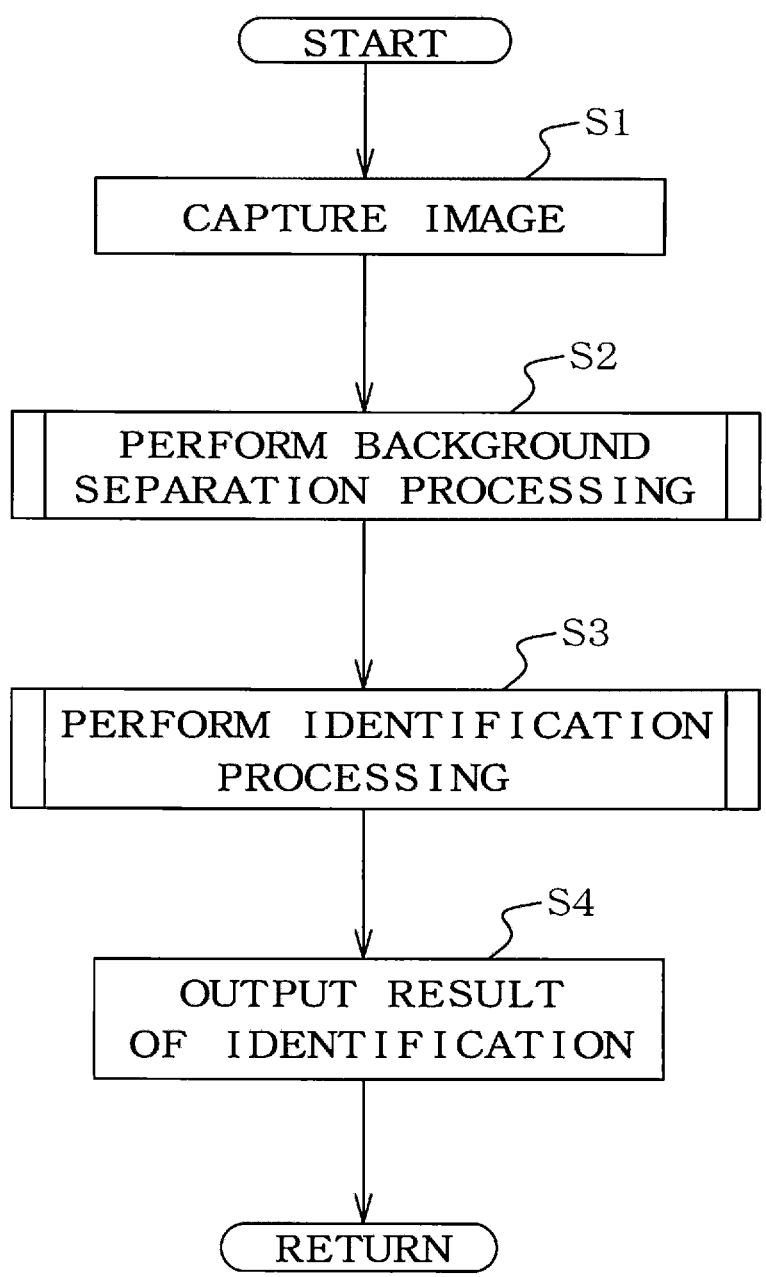
FIG. 4 is a flowchart showing an example of image processing.

Processing performed by the aforementioned image processing apparatus 6 is described in brief with reference to FIG. 4 as follows. Note that description below is given in terms of an example in which two types of pastries 4a, 4b have been placed on tray 3. First, operations resulting in input of a command to capture an image might be carried out for example at touch panel 61, as a result of which an image of pastries 4a, 4b which have been placed on tray 3 is captured by CCD camera 2 as illumination by backlighting from backlighting source 5 is carried out, and the captured digital color image is stored at image storage unit 62 (step S1). Next, the digital color image which has been stored is used to extract and establish the respective contour lines of pastries 4a, 4b, as a result of which background separation processing for partitioning and separating images of regions corresponding to the respective pastries 4a, 4b is performed (step S2). Processing for identification of the types of pastries 4a, 4b is then performed (step S3) based on the images of the regions corresponding to the respective pastries 4a, 4b, and the results of identification are output to touch panel 61, POS cash register 7, and/or the like (step S4).

Figure 5:
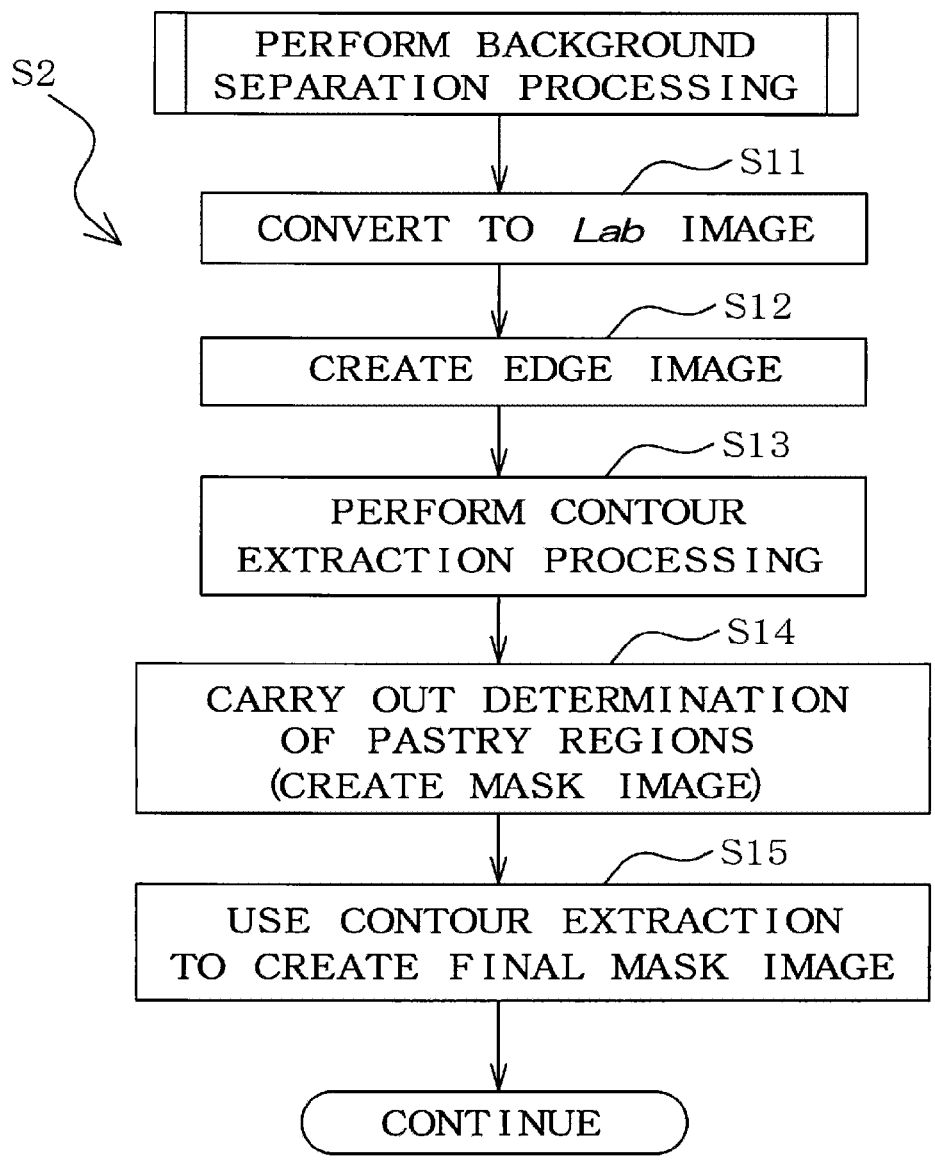
FIG. 5 is a flowchart showing an example of background separation processing which is included within the image processing at FIG. 4.

Next, background separation processing (step S2) will be described in detail with reference to FIG. 5. This background separation processing is processing that serves as precondition for and should be performed prior to the identification processing (step S3) which is the target thereof. That is, the image (original image; digital color image) stored at image storage unit 62 depicts a tray 3 against a background, the image which was captured being that of pastries 4a, 4b placed on a tray 3, and execution of background separation processing (step S2) as described below permits the portion corresponding to tray 3 which is the background to be separated therefrom such that only the portion corresponding to pastries 4a, 4b is extracted, as a result of which it is possible to perform identification processing based on operations such as comparison with characteristic quantities based on models constructed for each of the various types of pastry which are stored and/or updated at master data storage unit 65.

Figure 6:
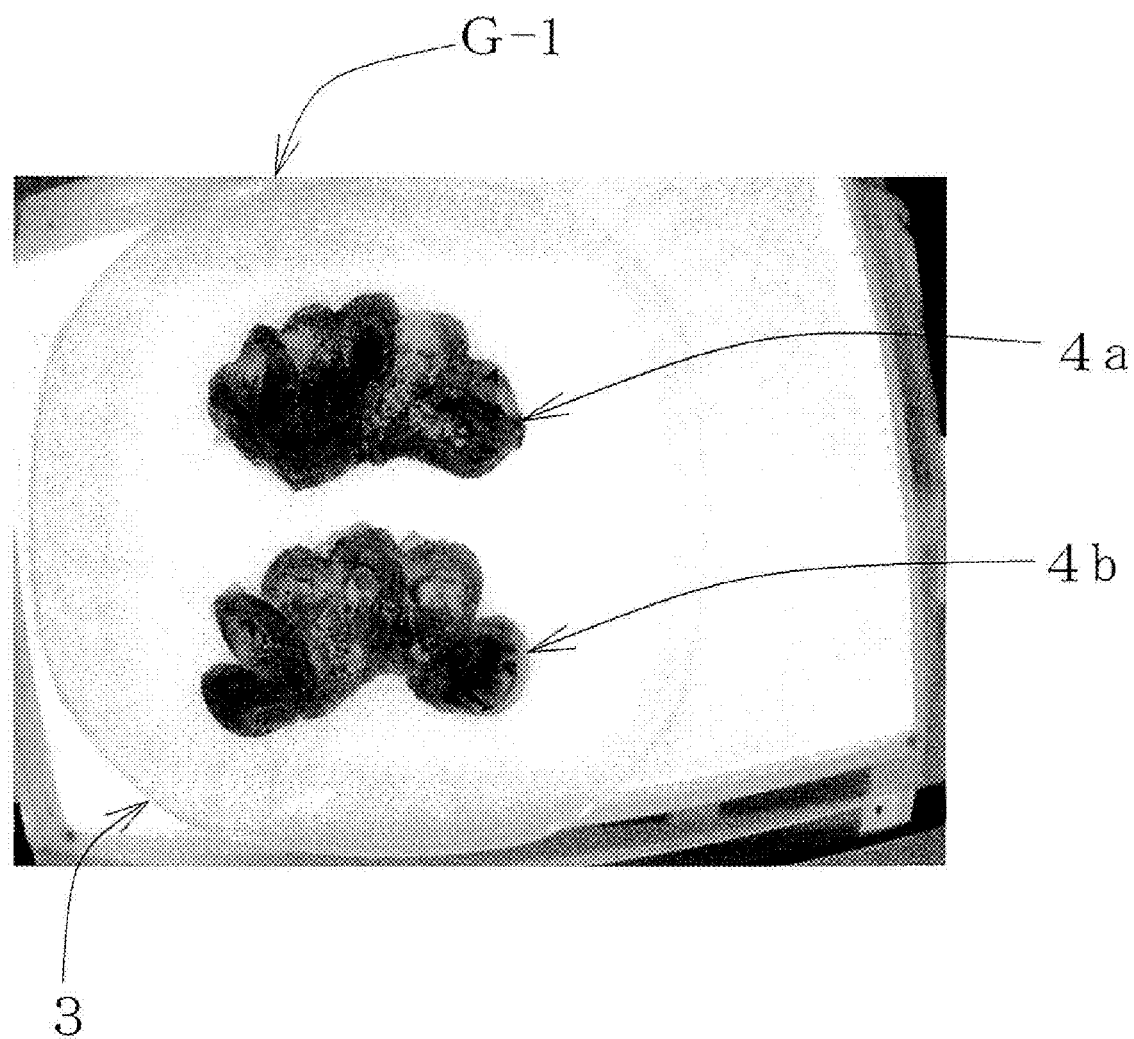
FIG. 6 is a drawing showing an example of an L image.
Figure 7:
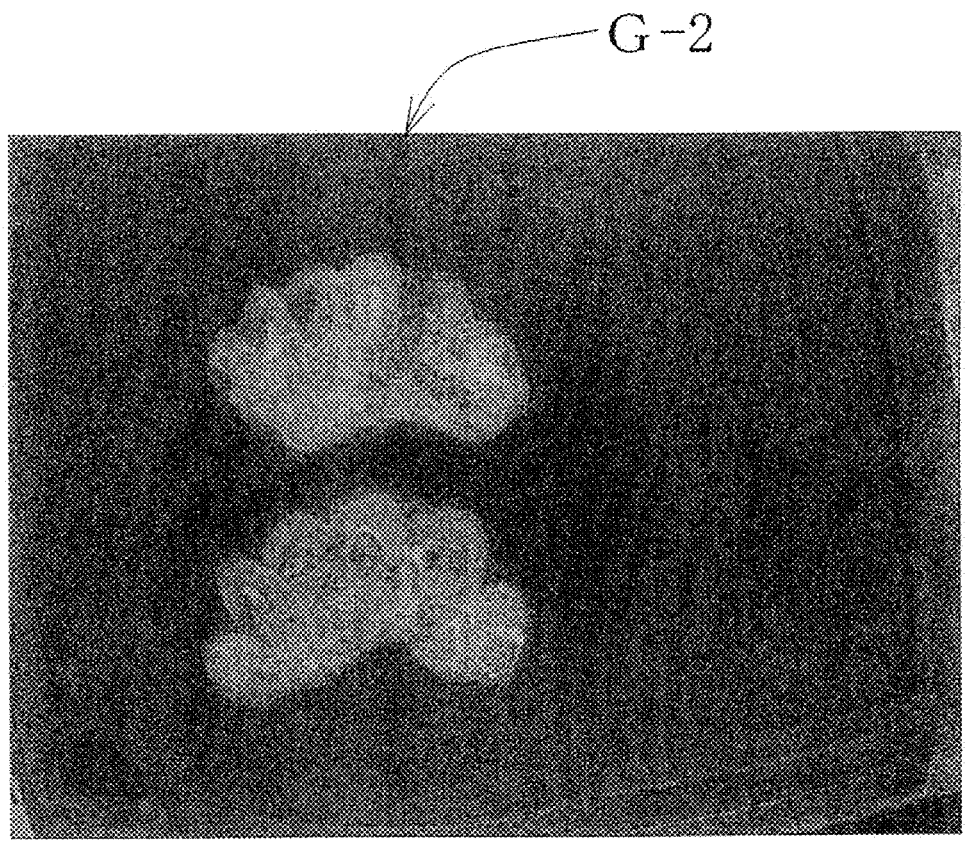
FIG. 7 is a drawing showing an example of an a image.
Figure 8:
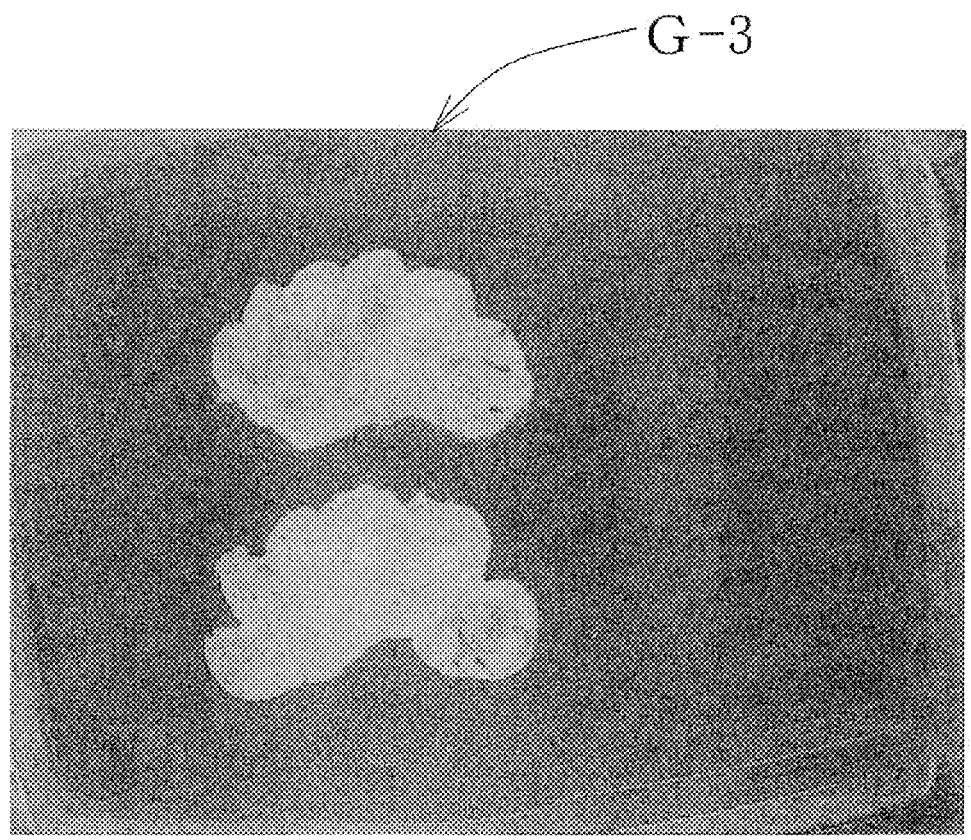
FIG. 8 is a drawing showing an example of a b image.

First, the digital color image captured at image storage unit 62 is converted to an Lab image (step S11). An Lab image is an image comprising an L image, an a image, and a b image, conversion thereinto being respectfully carried out to obtain the components thereof that lie along the L-axis, a-axis, and b-axis which make up Lab color space (i.e., CIELAB; L*a*b* colorimetric system; uniform color space). That is, the aforementioned Lab color space permits colors to be expressed in terms of coordinates in a three-dimensional space in which the L axis represents the brightness of a color, the a axis represents color position between red and green, and the b axis represents color position between yellow and blue, it being possible, for example, to express the color difference between one color and another color with which the first color is being compared as a distance between the coordinates of the respective colors in the aforementioned three-dimensional space. The aforementioned conversion into an Lab image is such that the captured digital color image is respectively converted into an L image G-1 (see, e.g., FIG. 6) depicting only the brightness component corresponding to the L-axis, an a image G-2 (see, e.g., FIG. 7) depicting the color position corresponding to the a-axis, and a b image G-3 (see, e.g., FIG. 8) depicting the color position corresponding to the b-axis.

Figure 9:
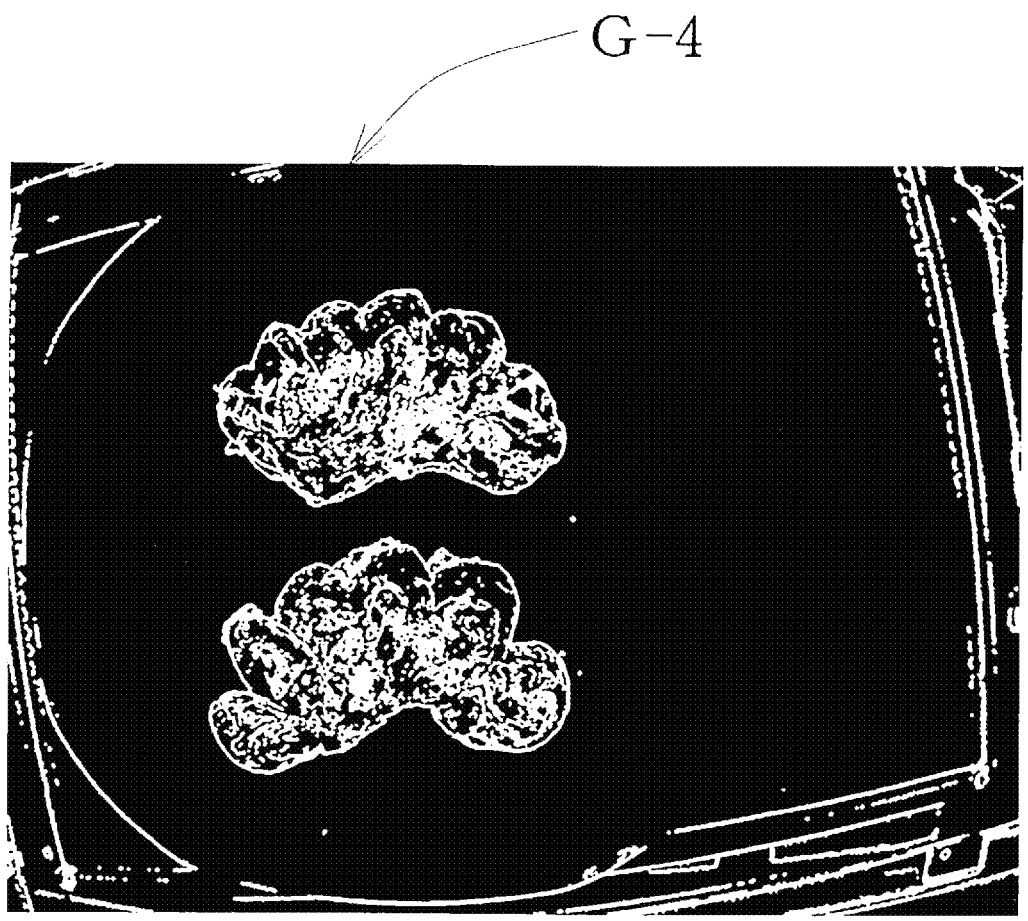
FIG. 9 is a drawing showing an example of an image obtained after carrying out dilation processing on an edge image obtained using the Canny algorithm.

Next, an edge image is created (step S12). An edge refers to a point at which pixel value changes abruptly, or to a line segment connecting a plurality of such points, detection of such edge(s) making it possible to obtain not only the contour lines of pastries 4a, 4b but also characteristic shapes and so forth of respective pastries 4a, 4b. While it is possible to employ any of a variety of techniques for edge detection, in the present embodiment edge detection is carried out using the Canny algorithm on the aforementioned L image G-1 which depicts only the brightness component, dilation processing being carried out so as to enhance detected edge(s) and obtain edge image(s) (see, e.g., image G-4 at FIG. 9). For example, the Sobel function, the Laplace function, or other such derivative function contained in the Open Source Library for image processing, or the Canny function or other such edge detection function, may be used to carry out edge detection, and the detected edge(s) may be output to an output image region of the same size as the original L image G-1. Carrying out dilation processing on the edge image obtained will make it possible to obtain an edge image G-4 (see, e.g., FIG. 9) which is further enhanced.

Figure 10:
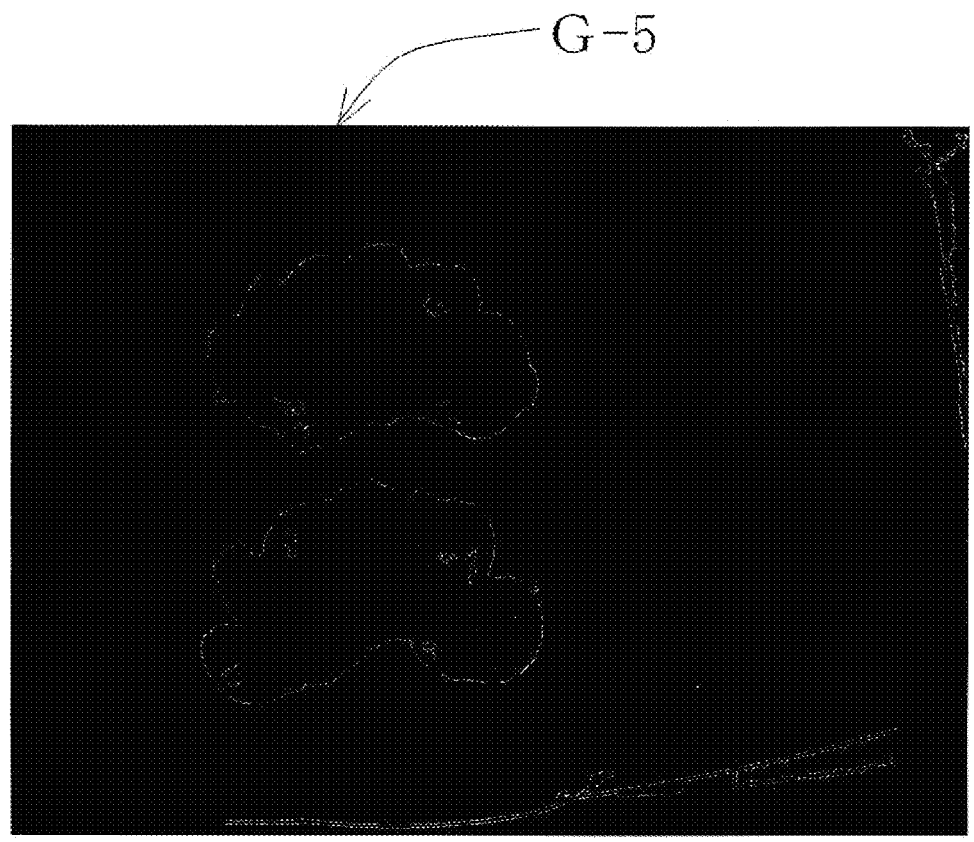
FIG. 10 is a drawing showing an example of an image obtained by performing contour extraction based on the image of FIG. 9.

During contour extraction processing (step S13) which comes next, that edge among the edges depicted in the aforementioned edge image G-4 which is the line corresponding to the outermost rim (outermost border) is extracted as a contour line, and determination is carried out with respect to the state of chromatic dispersion at each segmented image region in the L image G-1, a image G-2, and b image G-3 to extract contour lines for pastries 4a, 4b and create contour extraction image G-5 (see, e.g., FIG. 10). The reason for carrying out the latter determination with respect to the state of chromatic dispersion is that, since some of the target pastries 4 might, for example, have donut-like through-holes at their interiors, this is to permit definitive extraction of contour lines even where the pastry 4 is of such hole-containing shape. Here, while tray 3, which corresponds to the background, has small chromatic dispersion (rate of change) because it is uniformly whitish in color as a result of being illuminated by backlighting, regions corresponding to pastries 4a, 4b have large chromatic dispersion. Because region(s) occupied by the aforementioned through-hole(s) are illuminated by backlighting, they will, like the region occupied by tray 3 which corresponds to the aforementioned background, be unaffected by shadows or the like and will have small chromatic dispersion. For this reason, even if donut-like through-hole(s) or the like are present at pastry 4, it will be possible to accurately differentiate these as background, as a result of which it will be possible to cause border line(s) between pastry 4 and such through-hole(s) to be extracted as contour line(s), and it will at the same time be possible to utilize these for determination of region(s) corresponding to pastries 4a, 4b.

Figure 11:
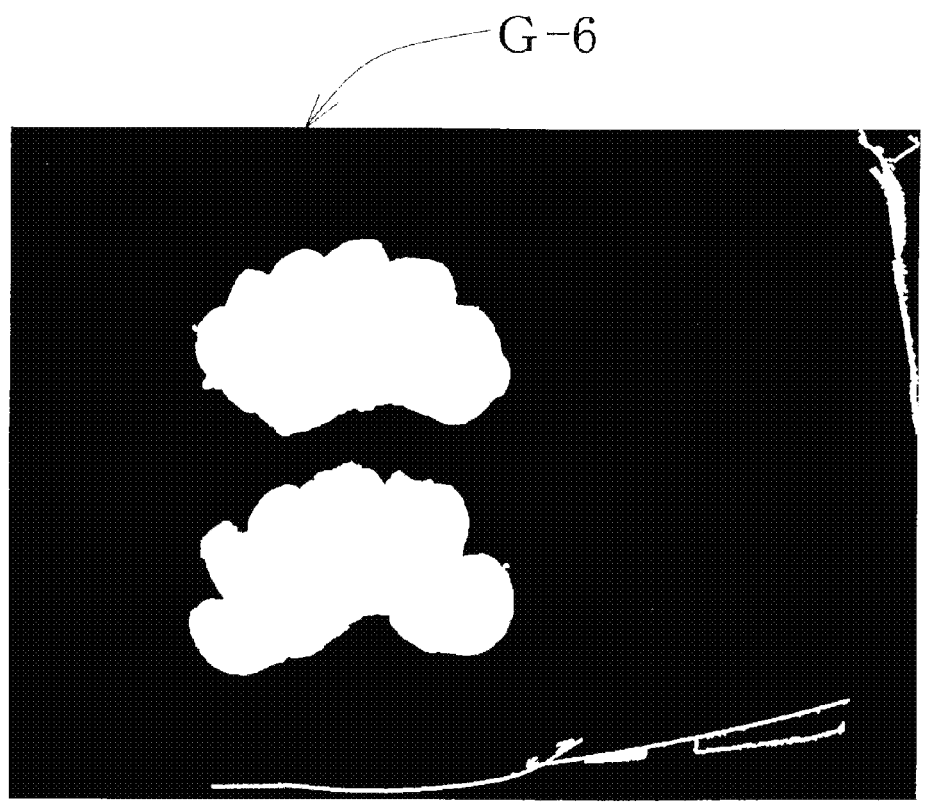
FIG. 11 is a drawing showing an example of a mask image created based on the image of FIG. 10.

Region(s) having large chromatic dispersion, from which the aforementioned region(s) having small chromatic dispersion (background) have been excluded, are deemed to be pastry 4a, 4b which is in the foreground, this determination based on chromatic dispersion being carried out in combination with determination based on color distance in which, because region(s) occupied by tray 3 which is in the background will be the color of the backlighting which has been transmitted through tray 3 (whitish in color), distance (distance in Lab color space between coordinates L1, a1, b1 of the backlighting color and coordinates L2, a2, b2 of the color being compared therewith; i.e., the square root of the sum of respective squares of $\Delta L$, $\Delta a$, and $\Delta b$) from the color of the backlighting is calculated for each of the same segmented regions for which processing was performed at each of the segmented regions mentioned above, region(s) for which this distance is small being deemed to be background region(s) in the background, and region(s) for which this distance is large being deemed to be pastry 4a, 4b in the foreground. By carrying out determination as to foreground and background based on color distance in addition to carrying out determination based on chromatic dispersion as described above, e.g., where the pastry 4a, 4b is itself white pastry, and even where white powdered sugar is present or there is a glossy surface that shines with whitish luster at the top surface of pastry 4a, 4b, it will be possible to accurately determine that such region(s) are pastry 4a, 4b, without misidentifying them as background. By demarcating region(s) corresponding to pastry 4a, 4b in this way, mask image G-6 (see, e.g., FIG. 11) is created.

Figure 12:
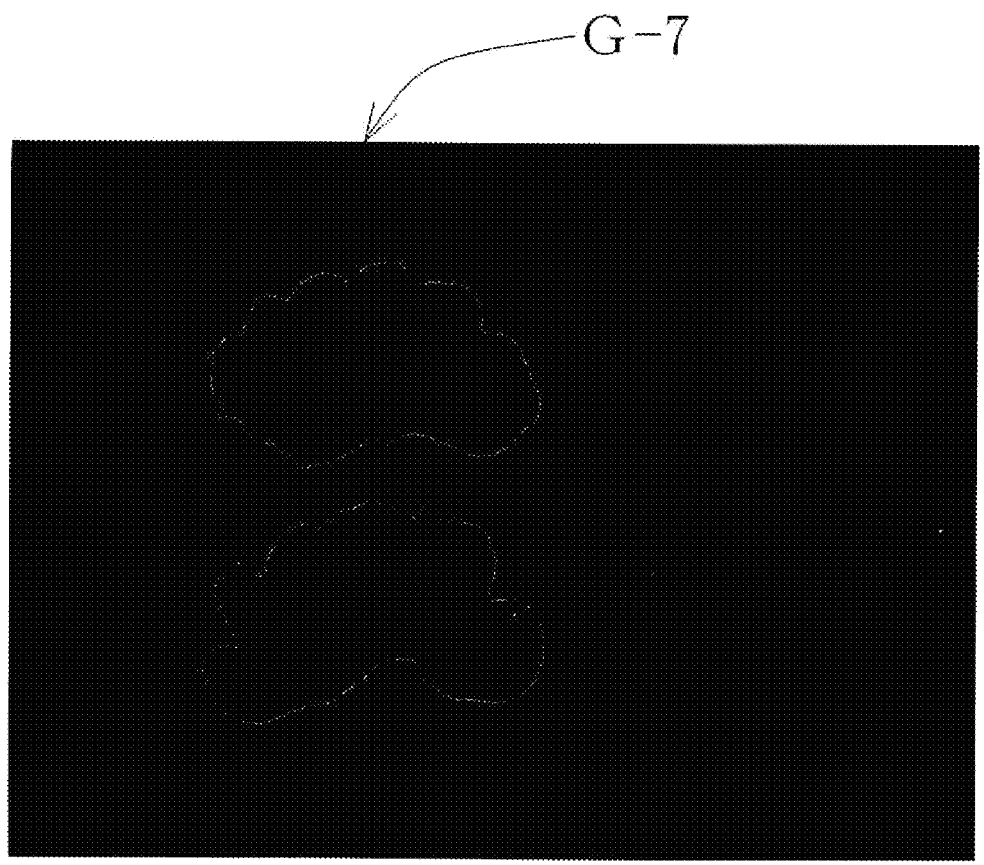
FIG. 12 is a drawing showing an example of a contour extraction image created based on the image of FIG. 11.
Figure 13:
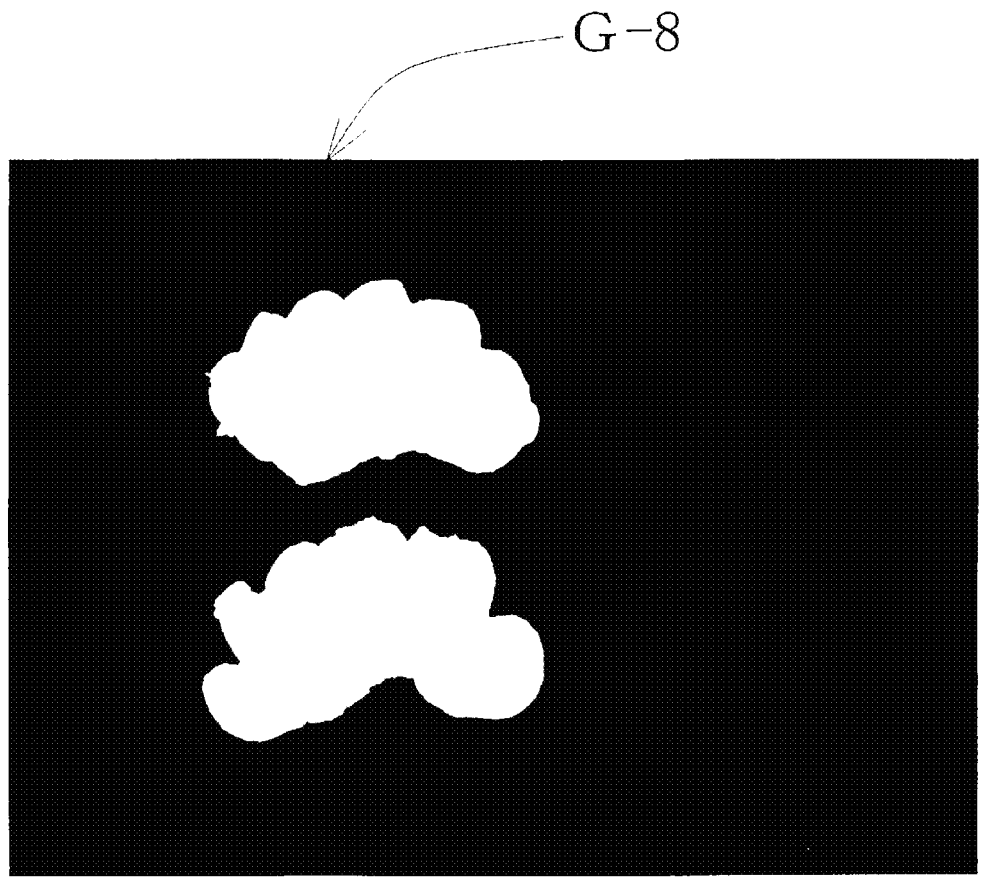
FIG. 13 is a drawing showing an example of a mask image which is ultimately obtained for separation of pastry region(s).

While it is possible to proceed to identification processing (step S3; see FIG. 4) based on the foregoing minimal processing, in the present embodiment the following processing is carried out to further improve precision. That is, preprocessing in the form of erosion processing and dilation processing is carried out on mask image G-6, the mask image which has been subjected to this preprocessing is used to again extract contour lines and create a contour extraction image G-7 (see, e.g., FIG. 12), and this contour extraction image G-7 is used to again create a mask image. Erosion processing and dilation processing is carried out on the mask image obtained to achieve noise reduction and produce the final mask image G-8 (see, e.g., FIG. 13). By extracting, from the original digital color image, information pertaining to region(s) corresponding to region(s) where whitish color is transmitted in this mask image G-8 and outputting this to identification processing unit 64, identification processing (step S3; see FIG. 4) can be performed based on such region information, as a result of which processing for identification of type(s) of pastries 4*a*, 4*b* can be performed.

When the foregoing is carried out, as a result of the fact that separation of background is performed based on image(s) captured while illumination from backlighting is present, it is possible to obtain actions and benefits such as the following as compared with the situation in which backlighting is not employed. That is, even where pastry 4*a*, 4*b* is white pastry and an image of this is captured while this is lying on a white tray 3, or even where white portions are present at parts of pastry 4*a*, 4*b*, use of background which is illuminated by backlighting makes it possible for such pastry 4*a*, 4*b* which is white or such pastry 4*a*, 4*b* which has white portions to be extracted from the background and for extraction of such region(s) to be carried out in definitive fashion. Furthermore, even where the height of pastry 4*a*, 4*b* is moderately high, or where affected by shadow due to the fact that there are a plurality of pastries 4*a*, 4*b*, or where there is a donut-like through-hole present at the interior and a shadow falls upon the interior of such a through-hole, use of background which is illuminated by backlighting will make it possible for region(s) corresponding to pastry 4*a*, 4*b* to be extracted in such fashion that influence from shadows and the like is excluded therefrom, and will make it possible for region(s) corresponding to pastry 4*a*, 4*b* to be extracted in stable fashion without being influenced by ambient light surrounding the object identification apparatus. This will also make it possible to carry out processing for identification of pastry 4*a*, 4*b* in more accurate fashion. That is, where pastry 4 to be identified is such that even where type is the same there are large individual differences in baked shape, and even though it may be said that most are generally round it is also true that none is exactly circular, shape being irregular and ranging from those which are nearly circular to those which are nearly elliptical, it will be possible to accurately extract the configuration of such pastry 4, and when the extracted information is used to carry out identification it will be possible for identification to be performed more efficiently. Moreover, employment of LED(s) at the backlighting source 5 which permits such benefits to be obtained will make it possible for this to be accomplished in the context of a thin device and will permit reduction in size of the overall apparatus.

Other Embodiments

Whereas in the foregoing embodiment contour extraction processing based on difference in brightness was performed by converting a digital color image into an L image G-1 reflecting the component along the L-axis (i.e., the brightness component) in Lab color space and using this L image G-1 to carry out processing, besides use of Lab color space (CIELAB) for representation of brightness, it is possible for example to use brightness as represented in any of the CIELUV, LCh, HSI, and/or HSL color spaces. Similarly with respect to the color space used for calculation of distance between coordinates representing color difference, this is not limited to the foregoing Lab color space, it being possible for example to use any of the CIELUV, LCh, HSI, and/or HSL color spaces.

Figure 14:
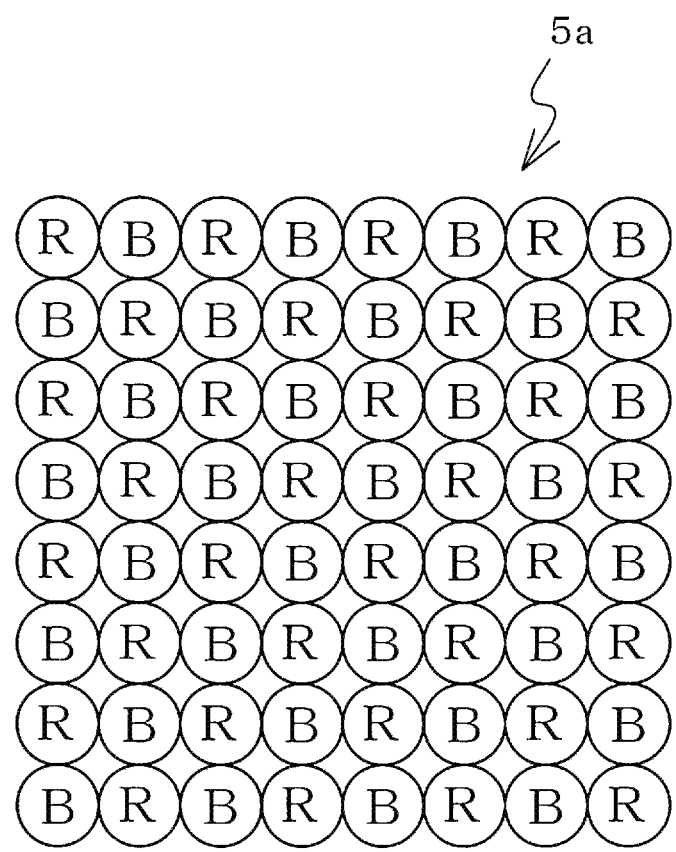
FIG. 14 is an explanatory plan view showing an example of a backlighting source.
Figure 15:
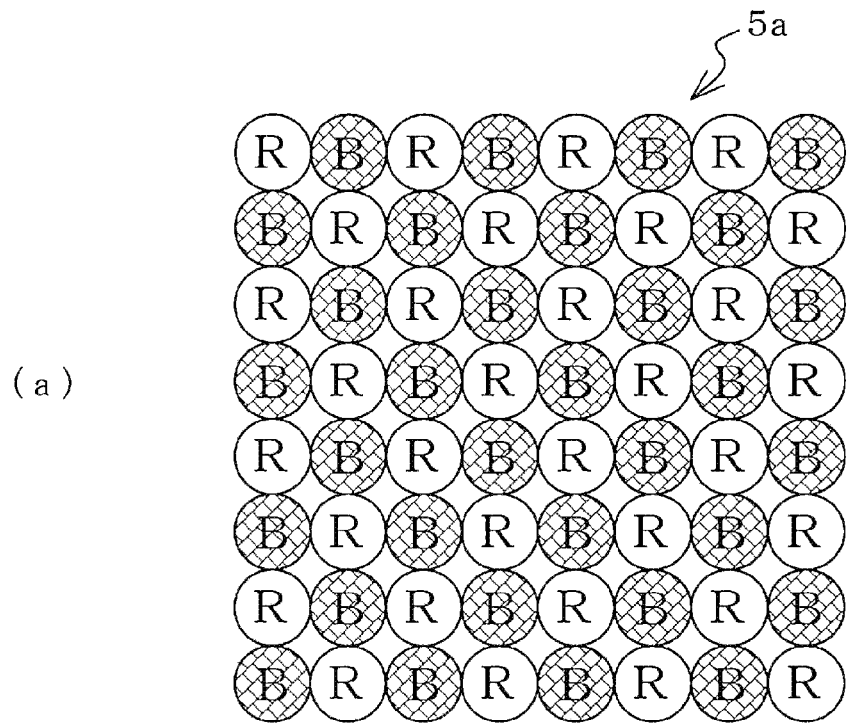
Figure 15:
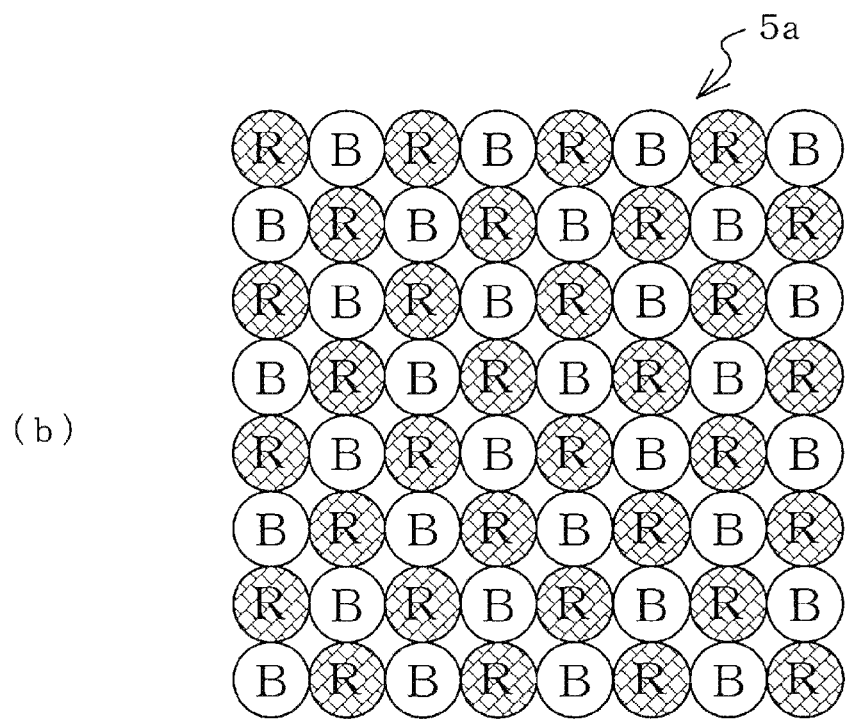
Figure 16:
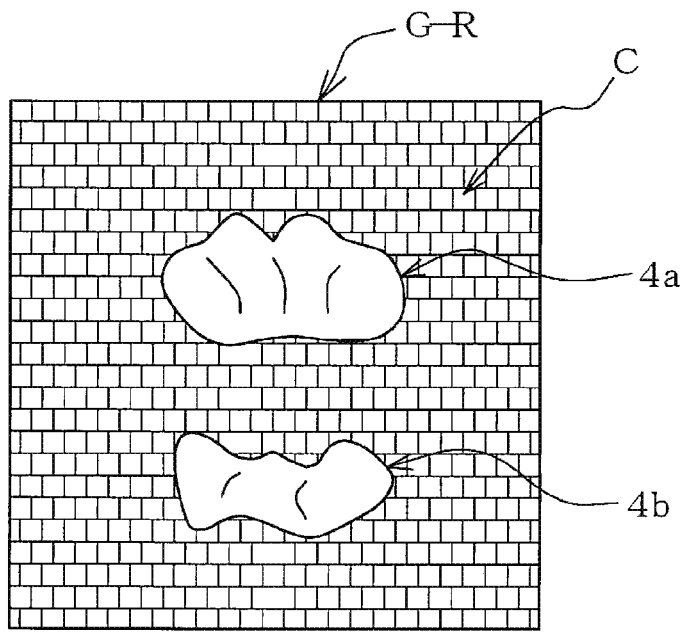
Figure 16:
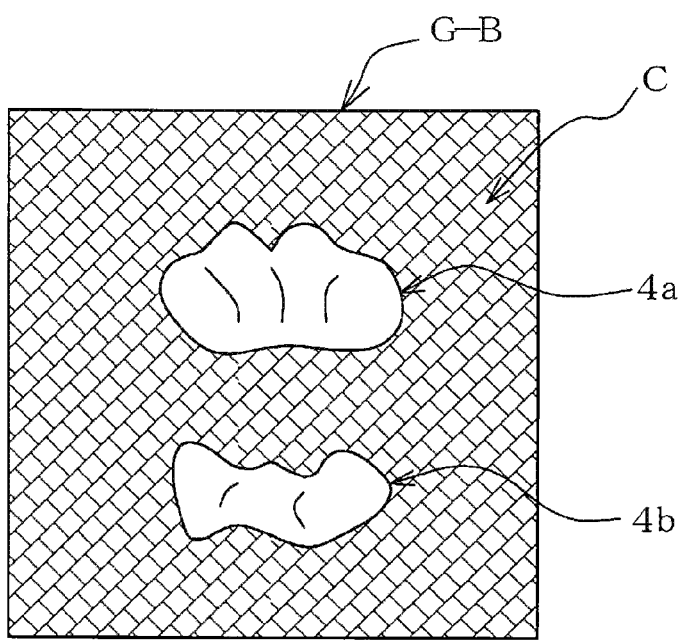

Furthermore, as shown by way of example in FIG. 14, if backlighting source 5*a* is made up of two types of LED of comparatively large mutual color difference, causing each color to be lit separately will make it possible to obtain two types of image in which illumination by backlighting is of mutually different color. For example, backlighting source 5*a* might be composed of red LEDs (indicated by "R" in FIG. 14) and blue LEDs (indicated by "B" in same drawing) which are arranged in alternating fashion in planar directions (8 in the vertical direction×8 in the horizontal direction in zigzagging arrangement in the example shown in the drawing). Moreover, as indicated at FIG. 15(*a*), by causing only red LEDs (R, R, . . . ) to be lit while blue LEDs (B, B, . . . ) are kept unlit (see hatching at same drawing), it will be possible cause tray 3 on which pastry 4*a*, 4*b* has been placed to be illuminated from behind by red backlighting. As shown at FIG. 16(*a*), this will make it possible to obtain image G-R in which background C, where pastry 4*a*, 4*b* is not present, is colored red. Furthermore, as indicated at FIG. 15(*b*), by causing only blue LEDs (B, B, . . . ) to be lit while red LEDs (R, R, . . . ) are kept unlit (see hatching at same drawing), it will be possible cause tray 3 on which pastry 4*a*, 4*b* has been placed to be illuminated from behind by blue backlighting. As shown at FIG. 16(*b*), this will make it possible to obtain image G-B in which background C, where pastry 4*a*, 4*b* is not present, is colored blue. By comparing this image G-R having red background and this image G-B having blue background and by extracting region(s) for which there is no change, or region(s) for which the change is less than a prescribed threshold value, it will be possible to separate such region(s) from background and determine that such region(s) are pastry 4*a*, 4*b*.

What is claimed is:

1. An object identification apparatus, comprising:
image processing means that stores a digital color image of at least one object lying on a tray which has been captured by image capture means, and that performs image recognition on the digital color image to identify at least one type of the at least one object; and
a backlighting source for producing illumination by backlighting from behind the tray during image capture by the image capture means;
wherein the tray is formed so as to be at least semitransparent such that the backlighting is transmitted therethrough to the image capture means side thereof;
wherein the image processing means comprises a background separation processing unit that captures an image of an entirety of the at least one object together with at least a portion of the tray as background while illumination by backlighting from the backlighting source is carried out, and that extracts and separates, from a region associated with the background, at least one region associated with the at least one object which is contained in the captured digital color image, and is constituted so as to perform processing for identification with respect to type of the at least one object for each of the at least one region associated with the at least one object obtained by separation by the background separation processing unit;
wherein the background separation processing unit is constituted so as to convert the digital color image into an image reflecting a brightness component thereof, use the image obtained by conversion which reflects the brightness component to extract a contour line which is a border line between the object and the background, and use the contour line to extract, from the region associated with the background, the at least one region associated with the at least one object; and
wherein the background separation processing unit is further constituted so as to use a color space having a brightness axis to represent the brightness component, and so that the image obtained by conversion reflects the brightness component along the brightness axis.

2. An object identification apparatus according to claim 1, wherein the color space used during processing performed by the background separation processing unit is an Lab color space.

3. An object identification apparatus according to claim 1, wherein the background separation processing unit is further constituted so as to carry out determination as to whether a location is in the region associated with the background, or is in the at least one region associated with the at least one object, based on magnitude of a distance between color coordinates corresponding thereto in the color space.

4. An object identification apparatus according to claim 3, wherein the color space used during processing performed by the background separation processing unit is an Lab color space.

5. An object identification apparatus, comprising:
image processing means that stores a digital color image of at least one object lying on a tray which has been captured by image capture means, and that performs image recognition on the digital color image to identify at least one type of the at least one object; and
a backlighting source for producing illumination by backlighting from behind the tray during image capture by the image capture means;
wherein the tray is formed so as to be at least semitransparent such that the backlighting is transmitted therethrough to the image capture means side thereof;
wherein the image processing means comprises a background separation processing unit that captures an image of an entirety of the at least one object together with at least a portion of the tray as background while illumination by backlighting from the backlighting source is carried out, and that extracts and separates, from a region associated with the background, at least one region associated with the at least one object which is contained in the captured digital color image, and is constituted so as to perform processing for identification with respect to type of the at least one object for each of the at least one region associated with the at least one object obtained by separation by the background separation processing unit;
wherein the background separation processing unit is constituted so as to convert the digital color image into an image reflecting a brightness component thereof, use the image obtained by conversion which reflects the brightness component to extract a contour line which is a border line between the object and the background, and use the contour line to extract, from the region associated with the background, the at least one region associated with the at least one object; and
wherein the background separation processing unit is further constituted so as to carry out determination as to whether a location is in the region associated with the background, or is in the at least one region associated with the at least one object, based on magnitude of a chromatic dispersion defined in terms of color coordinates in a color space.

6. An object identification apparatus according to claim 5, wherein the color space used during processing performed by the background separation processing unit is an Lab color space.

7. An object identification apparatus according to claim 5, wherein the background separation processing unit is further constituted so as to carry out determination as to whether the location is in the region associated with the background, or is in the at least one region associated with the at least one object, based on magnitude of a distance between color coordinates corresponding thereto in the color space.

8. An object identification apparatus according to claim 7, wherein the color space used during processing performed by the background separation processing unit is an Lab color space.

9. An object identification apparatus, comprising:
image processing means that stores a digital color image of at least one object lying on a tray which has been captured by image capture means, and that performs image recognition on the digital color image to identify at least one type of the at least one object; and
a backlighting source for producing illumination by backlighting from behind the tray during image capture by the image capture means;
wherein the tray is formed so as to be at least semitransparent such that the backlighting is transmitted therethrough to the image capture means side thereof;
wherein the image processing means comprises a background separation processing unit that captures an image of an entirety of the at least one object together with at least a portion of the tray as background while illumination by backlighting from the backlighting source is carried out, and that extracts and separates, from a region associated with the background, at least one region associated with the at least one object which is contained in the captured digital color image, and is constituted so as to perform processing for identification with respect to type of the at least one object for each of the at least one region associated with the at least one object obtained by separation by the background separation processing unit;
wherein the background separation processing unit is constituted so as to convert the digital color image into an image reflecting a brightness component thereof, use the image obtained by conversion which reflects the brightness component to extract a contour line which is a border line between the object and the background, and use the contour line to extract, from the region associated with the background, the at least one region associated with the at least one object;
wherein the background separation processing unit is further constituted so as to use a color space having a brightness axis to represent the brightness component, and so that the image obtained by conversion reflects the brightness component along the brightness axis; and
wherein the background separation processing unit is further constituted so as to carry out determination as to whether a location is in the region associated with the background, or is in the at least one region associated with the at least one object, based on magnitude of a chromatic dispersion defined in terms of color coordinates in the color space.

10. An object identification apparatus according to claim 9, wherein the color space used during processing performed by the background separation processing unit is an Lab color space.

* * * * *